(12) United States Patent
Jung et al.

(10) Patent No.: US 9,344,944 B2
(45) Date of Patent: May 17, 2016

(54) METHOD FOR PERFORMING MOBILITY IN A WIRELESS COMMUNICATION SYSTEM AND APPARATUS FOR THE SAME

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 14/009,950

(22) PCT Filed: Apr. 4, 2012

(86) PCT No.: PCT/KR2012/002535
§ 371 (c)(1),
(2), (4) Date: Oct. 4, 2013

(87) PCT Pub. No.: WO2012/138125
PCT Pub. Date: Oct. 11, 2012

(65) Prior Publication Data
US 2014/0031041 A1    Jan. 30, 2014

Related U.S. Application Data

(60) Provisional application No. 61/471,670, filed on Apr. 4, 2011, provisional application No. 61/612,402, filed on Mar. 19, 2012.

(51) Int. Cl.
*H04W 36/30* (2009.01)
*H04W 36/00* (2009.01)
*H04W 36/04* (2009.01)

(52) U.S. Cl.
CPC .......... *H04W 36/30* (2013.01); *H04W 36/0083* (2013.01); *H04W 36/04* (2013.01)

(58) Field of Classification Search
CPC . H04W 36/30; H04W 36/0061; H04W 36/00; H04W 36/0016; H04W 36/36; H04W 36/0083; H04W 36/04
USPC .......................................................... 455/37
See application file for complete search history.

(56) References Cited

U.S. PATENT DOCUMENTS

2007/0287476 A1    12/2007  Jeong et al.
2009/0047968 A1*   2/2009   Gunnarsson et al. ......... 455/446
(Continued)

FOREIGN PATENT DOCUMENTS

WO    2010/109302    9/2010

OTHER PUBLICATIONS

Panasonic, "CSG measurement with proximity indication," 3GPP TSG RAN WG2 #67, R2-094188, Aug. 2009, 4 pages.
(Continued)

*Primary Examiner* — Allahyar Kasraian
*Assistant Examiner* — B. M. M Hannan
(74) *Attorney, Agent, or Firm* — Lee, Hong, Degerman, Kang & Walmey; Jonathan Kang; Michael Monaco

(57) ABSTRACT

A method for performing mobility by a user equipment (UE) in a wireless communication system is provided. The method includes: receiving a report configuration from a serving cell, the report configuration including detection basis information; detecting whether a cell is present based on the detection basis information; transmitting, by the UE, a detection report reporting the detected cell is present to the serving cell; receiving a measurement configuration used for measuring the detected cell from the serving cell; measuring the cell based on the measurement configuration; and performing mobility with the cell.

7 Claims, 14 Drawing Sheets

(56) References Cited

U.S. PATENT DOCUMENTS

| | | | |
|---|---|---|---|
| 2009/0239533 A1* | 9/2009 | Somasundaram et al. | H04W 60/00 455/434 |
| 2010/0210268 A1* | 8/2010 | Lim et al. | 455/436 |
| 2010/0272018 A1* | 10/2010 | Furueda et al. | 370/328 |
| 2010/0317347 A1 | 12/2010 | Burbidge et al. | |
| 2010/0323631 A1* | 12/2010 | Martin et al. | 455/67.11 |
| 2011/0206011 A1* | 8/2011 | Ishida et al. | 370/331 |
| 2014/0128058 A1* | 5/2014 | Li et al. | H04W 24/04 455/423 |
| 2014/0155076 A1* | 6/2014 | Wang | H04W 48/18 455/450 |
| 2014/0349644 A1* | 11/2014 | Sylvie et al. | H04W 36/00 455/434 |

OTHER PUBLICATIONS

LG Electronics Inc., "CSG cell detection," 3GPP TSG-RAN2 Meeting #68, R2-097012, Nov. 2009, 6 pages.

CATT, "Speed Dependent Scaling in CA," 3GPP TSG RAN WG2 Meeting #70, R2-102801, May 2010, 3 pages.

3rd Generation Partnership Project (3GPP), "Technical Specification Group Radio Access Network; Mobility procedures for Home Node B (HNB); Overall description; Stage 2 (Release 10)," 3GPP TS 25.367 V10.0.0, Mar. 2011, 14 pages.

Qualcomm Europe, "On the sufficiency of existing events for handling HNB inbound mobility for Rel-9 UEs," 3GPP TSG-RAN WG2 Meeting #67bis, R2-095979, Oct. 2009, 5 pages.

European Patent Office Application Serial No. 12768079.1, Search Report dated May 11, 2015, 8 pages.

\* cited by examiner

METHOD FOR PERFORMING MOBILITY IN A WIRELESS COMMUNICATION SYSTEM AND APPARATUS FOR THE SAME

CROSS-REFERENCE TO RELATED APPLICATIONS

This application is the National Stage filing under 35 U.S.C. 371 of International Application No. PCT/KR2012/002535, filed on Apr. 4, 2012, which claims the benefit of U.S. Provisional Application Ser. No. 61/471,670, filed on Apr. 4, 2011, and 61/612,402, filed on Mar. 19, 2012, the contents of which are all hereby incorporated by reference herein in their entirety.

TECHNICAL FIELD

The present invention relates to a wireless communication system, and more particularly, to a method and apparatus for performing mobility by a user equipment in a wireless communication system.

BACKGROUND ART $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A micro cell, a femto cell, and a pico cell, etc., having a small service area can be installed in a specific location of a macro cell having a wide coverage.

Due to mobility of a user equipment (UE) represented as a mobile device, quality of a currently provided service may deteriorate or a cell capable of providing a better service may be detected. Accordingly, the UE may move to a new cell, which is called performing of the mobility of the UE.

In order to perform the mobility, the UE persistently performs measurement on a serving cell and a neighboring cell. When the measurement result satisfies a condition for performing the mobility, the UE can receive an instruction from the serving cell and can directly perform the mobility.

Meanwhile, in order to perform measurement on a cell corresponding to a specific type, the UE performs the measurement in a state where a service received from the serving cell is suspended. In particular, in case of performing measurement on an inter-frequency cell, the measurement is performed on a frequency different from a frequency at which a service is previously received from the serving cell.

As such, since the measurement procedure performed by the UE is persistently performed by the UE even if the cell of the specific type does not exist nearby in practice, quality of a service provided to the UE may deteriorate. This is because an opportunity for receiving the service from the serving cell to perform the measurement is decreased. Accordingly, there is a need for a method for ensuring the quality of the service provided to the UE and for allowing the UE to properly perform the mobility.

SUMMARY OF INVENTION

Technical Problem

The present invention provides a method and an apparatus for performing mobility by a user equipment in a wireless communication system.

Solution to Problem

In an aspect, a method for performing mobility by a user equipment (UE) in a wireless communication system is provided. The method includes: receiving a report configuration from a serving cell, the report configuration including detection basis information; detecting whether a cell is present based on the detection basis information; transmitting, by the UE, a detection report reporting the detected cell is present to the serving cell; receiving a measurement configuration used for measuring the detected cell from the serving cell; measuring the cell based on the measurement configuration; and performing mobility with the cell.

The detection basis information may include a cell list.

The step of the detecting may include: receiving at least one identifier of at least one cell; and determining whether the at least one identifier is included in the cell list. An identifier of the detected cell may be included in the cell list.

The cell list may be for cells operating on a predetermined frequency.

The predetermined frequency may be different from a serving frequency of the serving cell.

The step of the measuring may be based on an inter-frequency measurement.

The report configuration may be transmitted in a proximity indication configuration massage used for instructing to detect a closed subscriber group (CSG) cell, and the detection report may be transmitted in a proximity indication message.

The detection report may include a non-CSG cell indicator indicating the detected cell is not the CSG cell.

The detection report may include information about the detected cell.

The information about the detected cell may include a measured signal quality of the detected cell.

The information about the detected cell may include a physical cell identifier of the detected cell.

The step of the performing handover may include: receiving a handover command message from the serving cell; and performing handover to the detected cell.

In another aspect, a wireless apparatus is provided. The apparatus includes: a radio frequency (RF) unit transmitting and receiving a radio signal; a processor operably coupled to the RF unit. The processor is configured for: receiving a report configuration from serving cell, the report configuration including detection basis information; detecting whether a cell is present based on the detection basis information; transmitting a detection report reporting the detected cell is present to the serving cell; receiving a measurement configuration used for measuring the detected cell from the serving cell; measuring the cell based on the measurement configuration; and performing mobility with the cell.

The detection basis information may include a cell list.

The detecting may include: receiving at least one identifier of at least one cell; and determining whether the at least one identifier is included in the cell list. An identifier of the detected cell may be included in the cell list.

The cell list may be for cells operating on a predetermined frequency.

The predetermined frequency may be different from a serving frequency of the serving cell.

The measuring may be based on an inter-frequency measurement.

Advantageous Effects of Invention

A UE can receive information indicating measurement on a cell of a specific type from a network, and can activate the measurement on the cell of the specific type according to the received information. Instead of persistently performing the measurement on the cell of the specific type, the UE starts the measurement after the measurement is indicated from the network. In particular, since a time period in which the UE is out of a frequency of a serving cell to perform inter-frequency measurement is decreased, a service can be provided more persistently from the serving cell. Accordingly, quality of the service provided to the UE may be more improved.

The UE detects a cell of a specific type, reports the detection result to the network, and performs measurement after receiving a measurement configuration. Therefore, since the measurement is performed when necessary, battery consumption caused by unnecessary measurement can be avoided. This can improve power efficiency of the UE.

MODE FOR THE INVENTION

Figure 1:
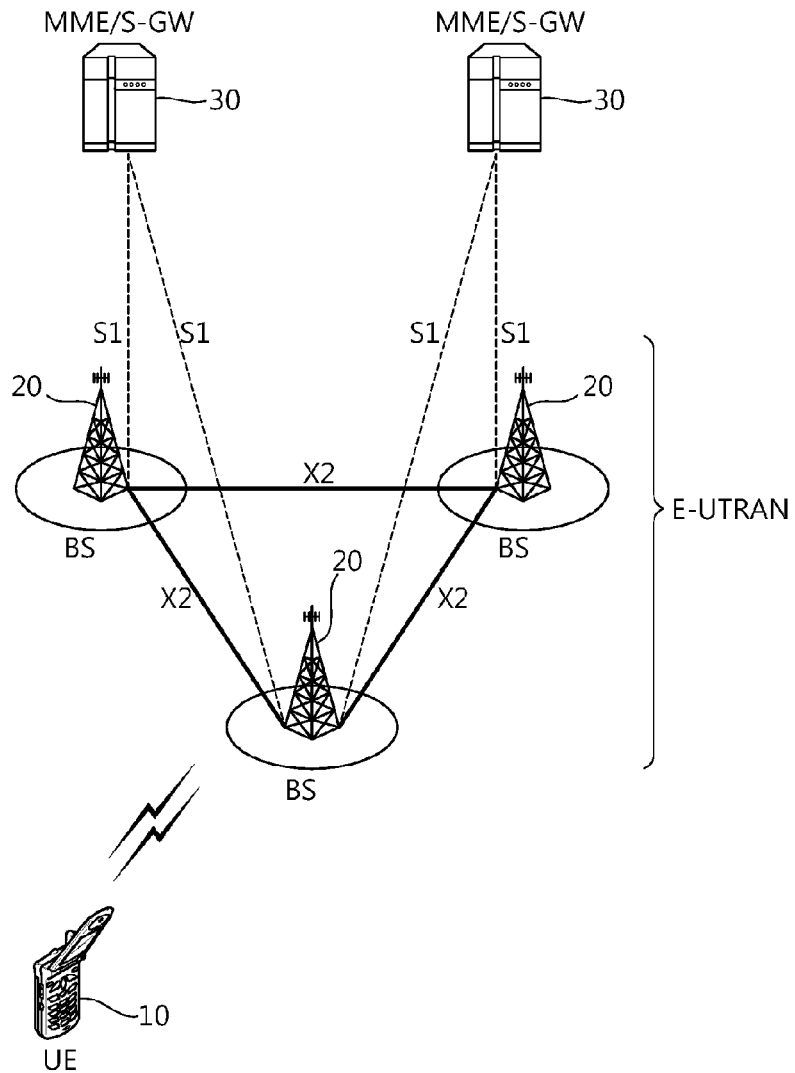
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
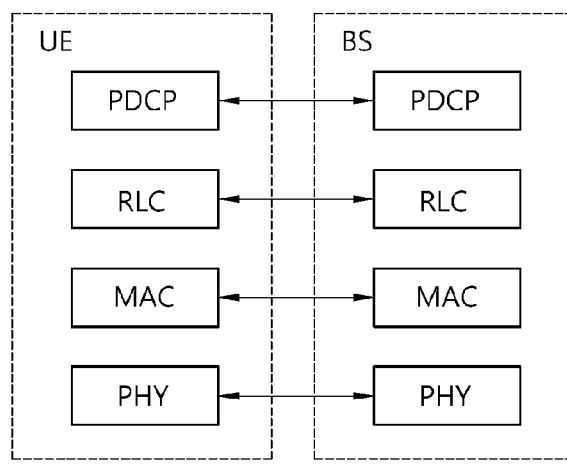
FIG. 2 is a diagram illustrating a radio protocol architecture for a user plane.
Figure 3:
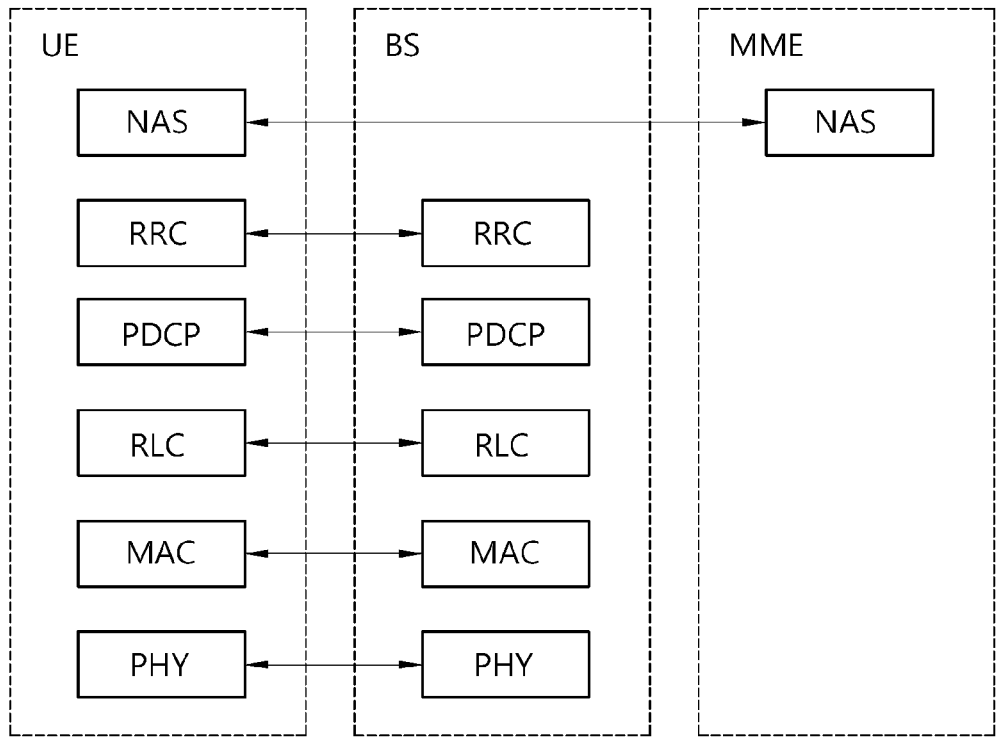
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each sub-frame may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
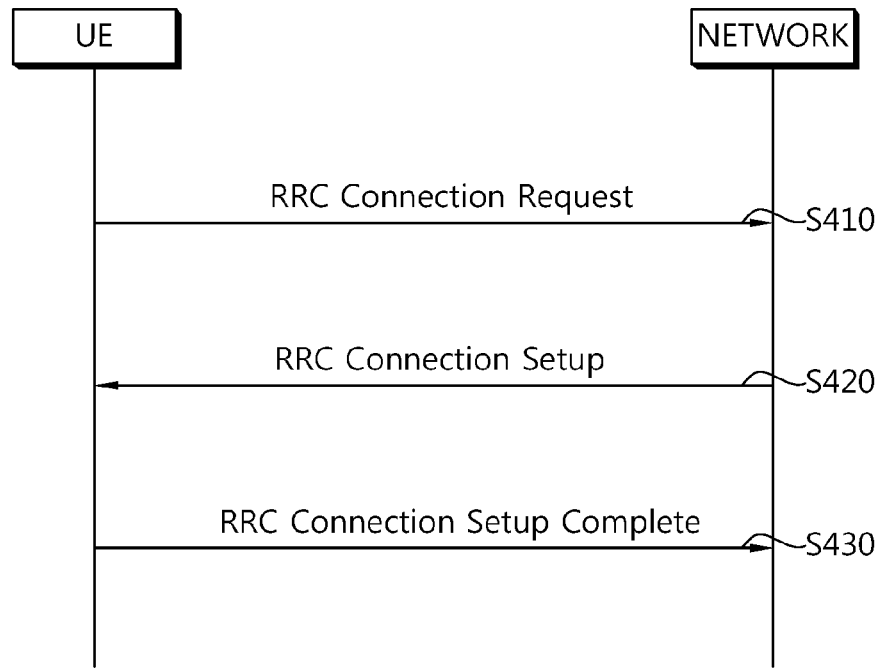
FIG. 4 is a flowchart showing an RRC connection establishment procedure.

FIG. 4 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 5:
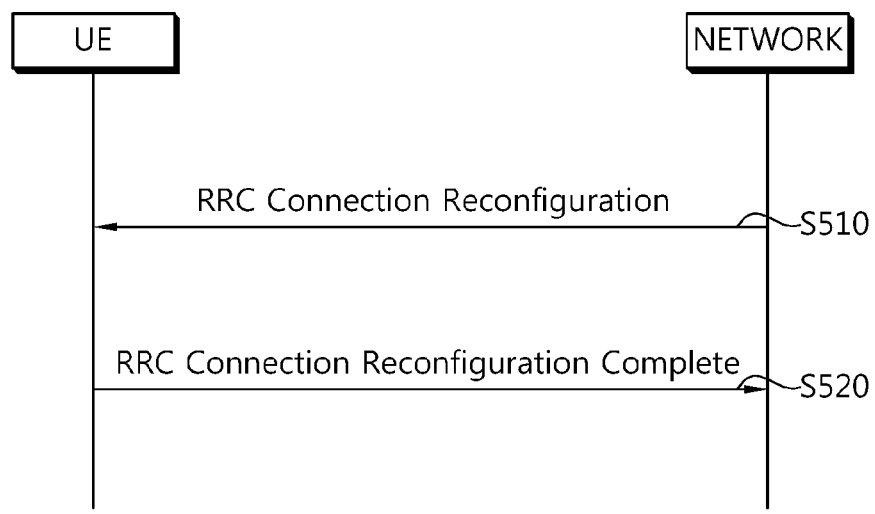
FIG. 5 is a flowchart showing an RRC connection reconfiguration procedure.

FIG. 5 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 6:
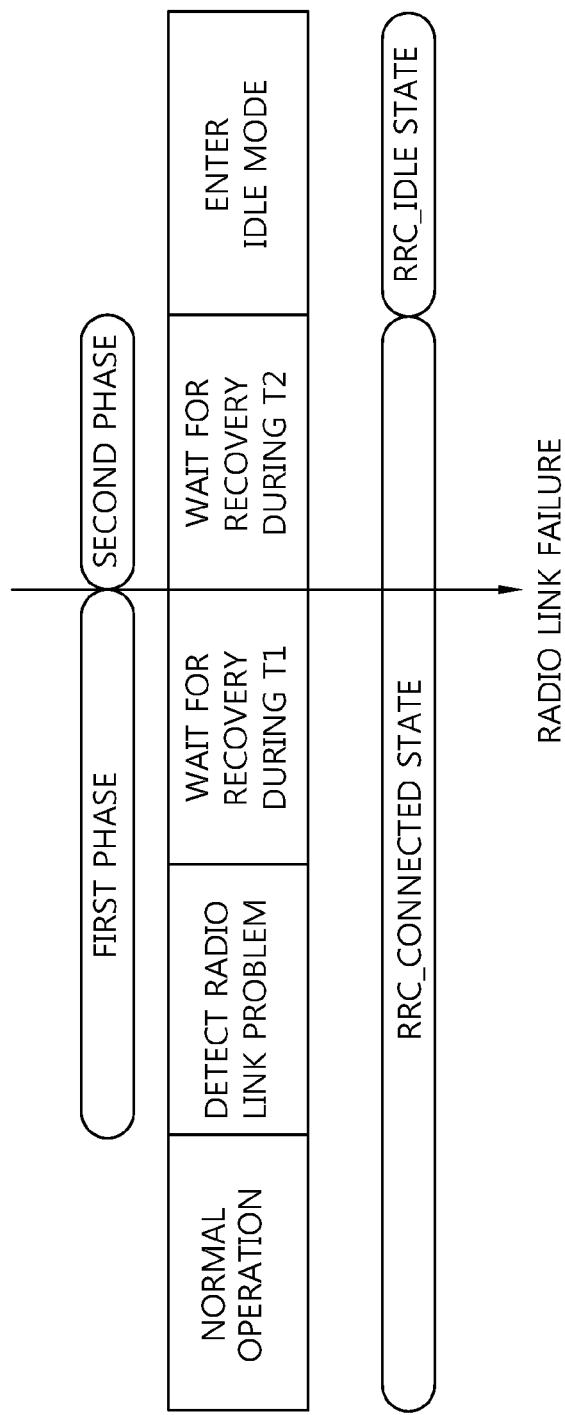
FIG. 6 shows an example of a radio link failure. An operation related to the radio link failure can be described in two phases.

FIG. 6 shows an example of a radio link failure. An operation related to the radio link failure can be described in two phases.

In a first phase, while performing a normal operation, a UE determines whether a current communication link has a problem. Upon detecting the problem, the UE declares a radio link problem, and waits for a recovery of the radio link during a first wait time T1. If the radio link is recovered before the expiry of the first wait time T1, the UE re-performs the normal operation. If the radio link is not recovered until the first wait time expires, the UE declares the radio link failure, and enters a second phase.

In the second phase, the UE waits again for the recovery of the radio link during a second wait time T2. If the radio link is not recovered until the second wait time expires, the UE enters an RRC idle state. Alternatively, the UE may perform an RRC re-establishment procedure.

The RRC connection re-establishment procedure is a procedure for re-establishing an RRC connection in an RRC connected state. Since the UE does not enter the RRC idle state, the UE does not initiate all connection configurations (e.g., radio bearer configuration, or the like). Instead, when the RRC connection re-establishment procedure starts, the UE temporarily suspends the use of other radio bearers except for an SRB. If the RRC connection re-establishment is successful, the UE resumes the use of radio bearers of which the use is temporarily suspended.

Figure 7:
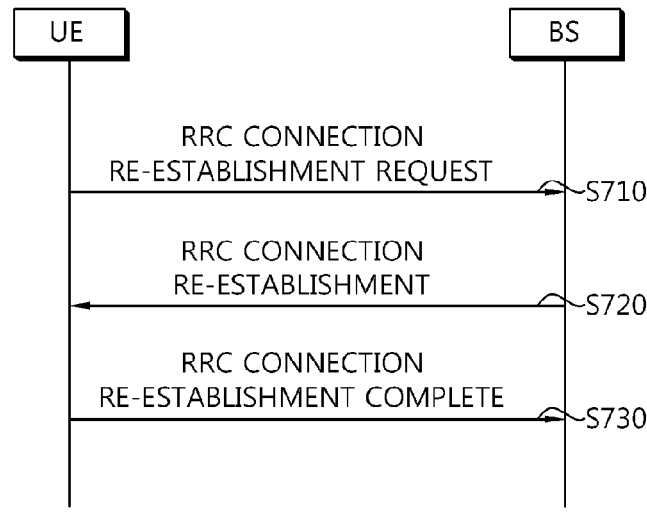
FIG. 7 is a flowchart showing a success of a connection re-establishment procedure.

FIG. 7 is a flowchart showing a success of a connection re-establishment procedure.

A UE performs cell selection to select a cell. The UE receives system information to receive basis parameters for cell access in the selected cell. Then, the UE sends an RRC connection re-establishment request message to a BS (step S710).

If the selected cell is a cell having the context of the UE, i.e., a prepared cell, the BS accepts the RRC connection re-establishment request of the UE, and transmits an RRC connection re-establishment message to the UE (step S720). The UE transmits an RRC connection re-establishment complete message to the BS, and thus the RRC connection re-establishment procedure can be successful (step S730).

Figure 8:
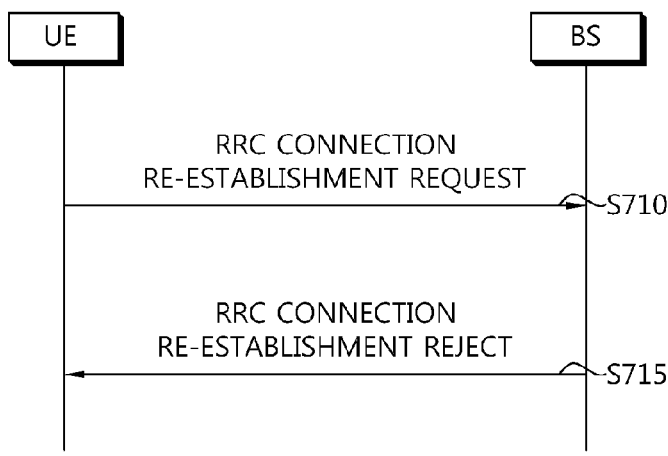
FIG. 8 is a flowchart showing a failure of a connection re-establishment procedure.

FIG. 8 is a flowchart showing a failure of a connection re-establishment procedure. A UE transmits an RRC connection re-establishment request message to a BS (step S710). If a selected cell is not a prepared cell, a BS transmits an RRC connection re-establishment reject message to the UE in response to an RRC connection re-establishment request (step S715).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_s = Q_{meas,s} + Q_{hyst}, \quad R_n = Q_{meas,n} - Q_{offset} \qquad \text{[Math. 1]}$$

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 9:
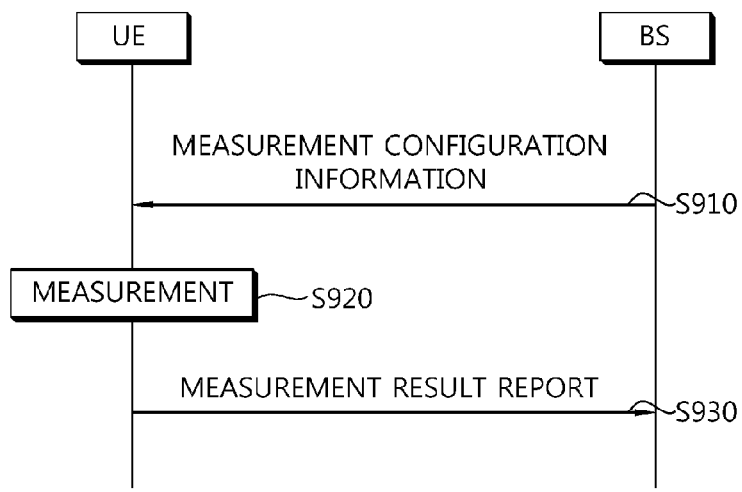
FIG. 9 is a flowchart showing a conventional method of performing measurement.

FIG. 9 is a flowchart showing a conventional method of performing measurement.

A UE receives measurement configuration information from a BS (step S910). A message including the measurement configuration information is referred to as a measurement configuration message. The UE performs measurement based on the measurement configuration information (step S920). If a measurement result satisfies a reporting condition included in the measurement configuration information, the UE reports the measurement result to the BS (step S930). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Event | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 10:
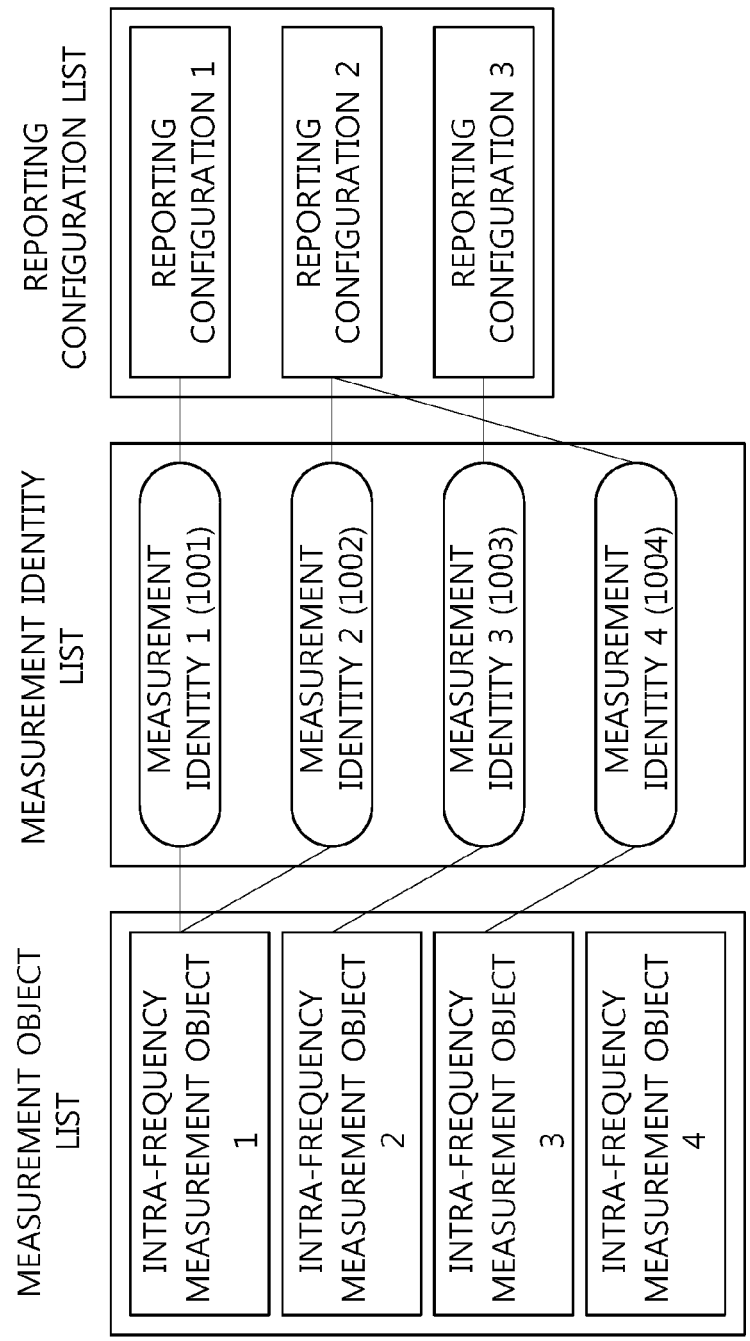
FIG. 10 shows an example of a measurement configuration assigned to a UE.

FIG. 10 shows an example of a measurement configuration assigned to a UE.

First, a measurement identity1 1001 associates an intra-frequency measurement object with a reporting configuration 1. The UE performs intra-frequency measurement. The reporting configuration 1 is used to determine a reporting type and a criterion for reporting a measurement result.

A measurement identity2 1002 is associated with the intra-frequency measurement object similarly to the measurement identifier1 1001, and associates the intra-frequency measurement object with a reporting configuration 2. The UE performs intra-frequency measurement. The reporting configuration 2 is used to determine a reporting format and a criterion for reporting a measurement result.

By using the measurement identity1 1001 and the measurement identity2 1002, the UE transmits a measurement result even if the measurement result on the intra-frequency measurement object satisfies any one of the reporting configuration 1 and the reporting configuration 2.

A measurement identity3 1003 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 1004 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 11:
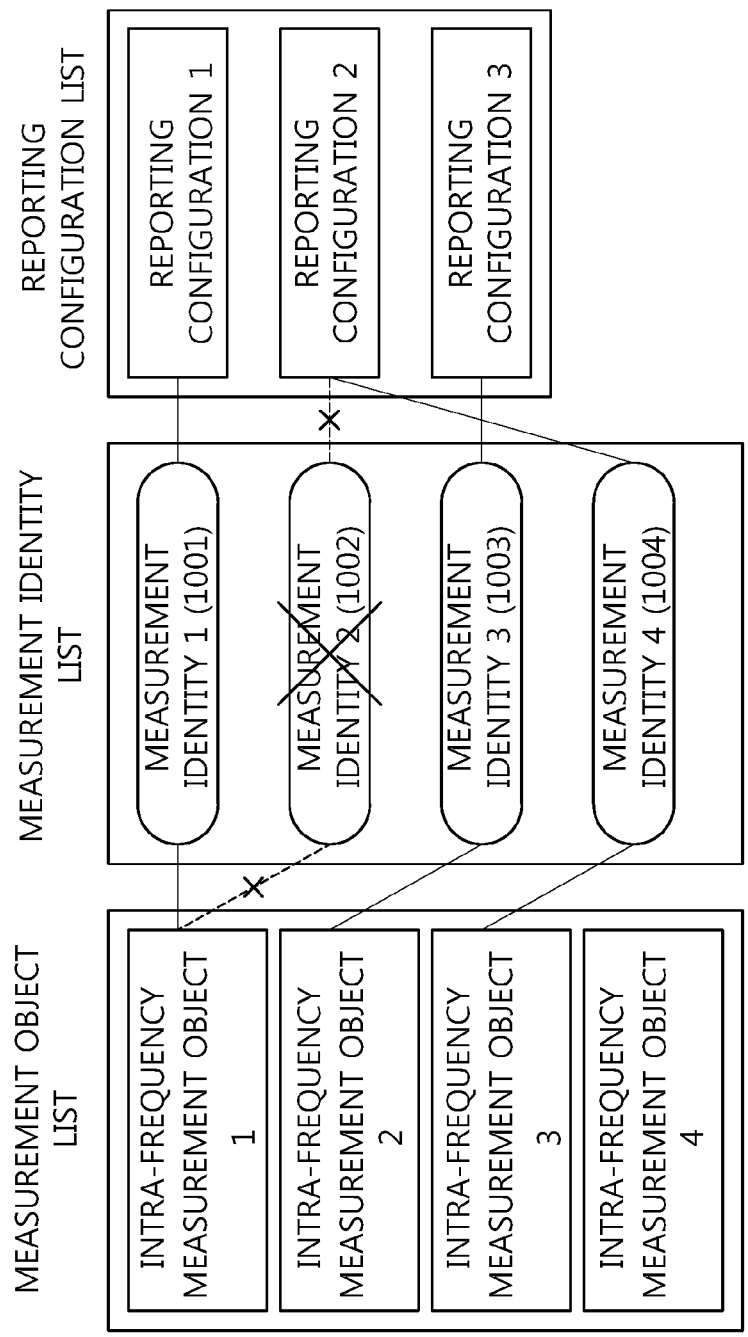
FIG. 11 shows an example of deleting a measurement identity.

FIG. 11 shows an example of deleting a measurement identity. When a measurement identity2 1002 is deleted, measurement on a measurement object associated with the measurement identity2 1002 is suspended, and a measurement report is not transmitted. A reporting configuration or a measurement object associated with the deleted measurement identity may not be modified.

Figure 12:
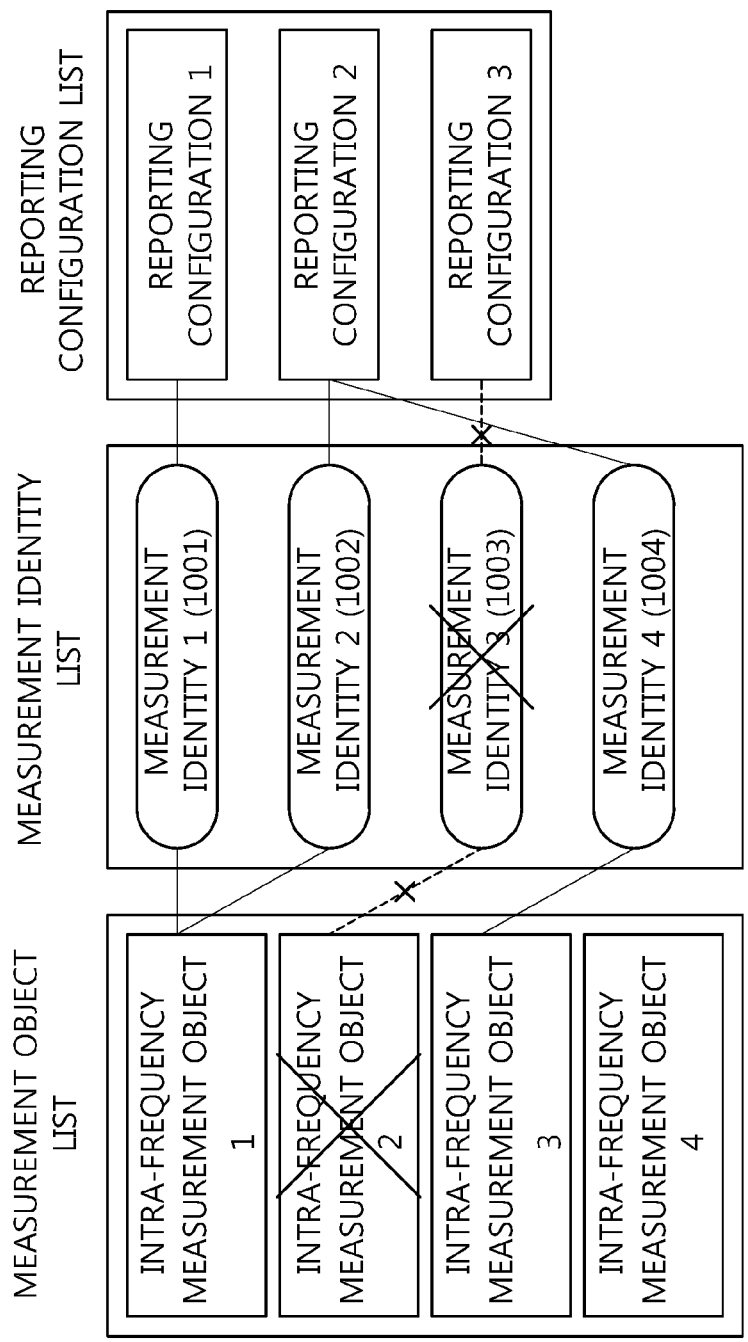
FIG. 12 shows an example of deleting a measurement object.

FIG. 12 shows an example of deleting a measurement object. When an inter-frequency measurement object 1 is deleted, a UE also deletes an associated measurement identifier3 1003. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

Figure 13:
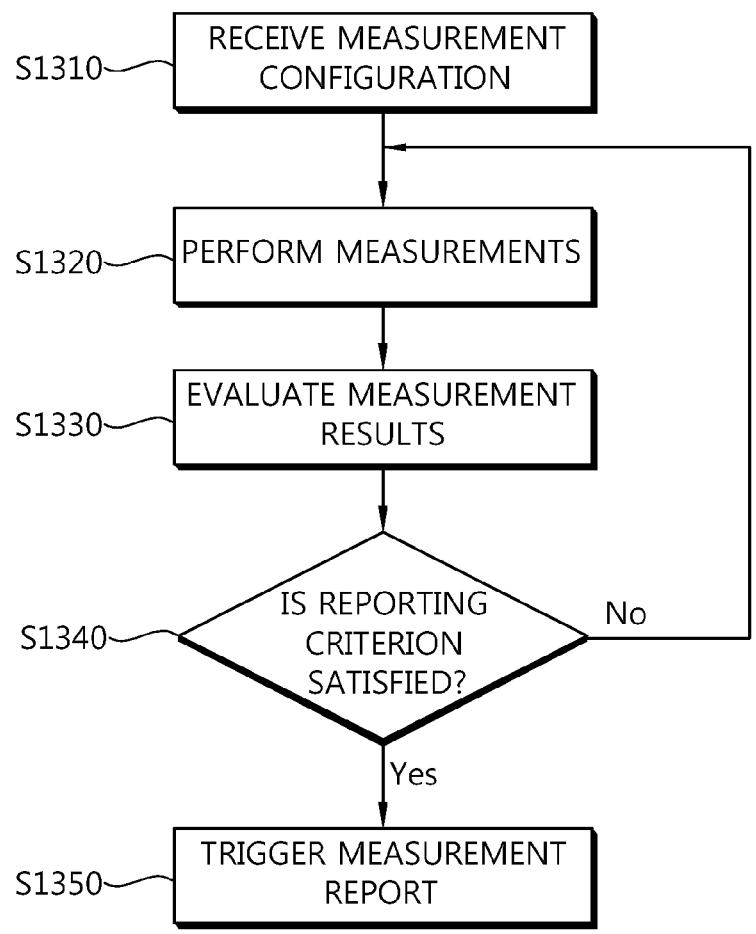
FIG. 13 shows a conventional measurement procedure.

FIG. 13 shows a conventional measurement procedure.

A UE receives a measurement configuration from a BS (S1310). The UE performs measurements for a measurement object identified by a measurement identity (S1320). The UE evaluates measurement results to determine whether a reporting criterion is satisfied (S1330). If the reporting criterion is satisfied (S1340), measurement report is triggered.

The measurement report may include a measurement identity, a measured quantity of a serving cell and a measurement result of a neighboring cell. The measurement identity identifies a measurement object on which the measurement report is triggered. The measurement result of the neighboring cell may include a cell identity of the neighboring cell and a measured quantity of the neighboring cell. The measured quantity may include at least one of RSRP and RSRQ.

The following description is about an H(e)NB.

In addition to a mobile network vendor, a mobile communication service can be provided via an eNB of an individual user or a specific vendor or a group owner. Such an eNB is called a home node B (HNB) or a home eNB (HeNB). Hereinafter, both the HNB and HeNB are collectively referred to as the HeNB. The HeNB is basically used to provide specialized services only to members of a closed subscriber group (CSG). However, according to operation mode setting of the HeNB, the services may also be provided to other users in addition to the users of the CSG.

Figure 14:
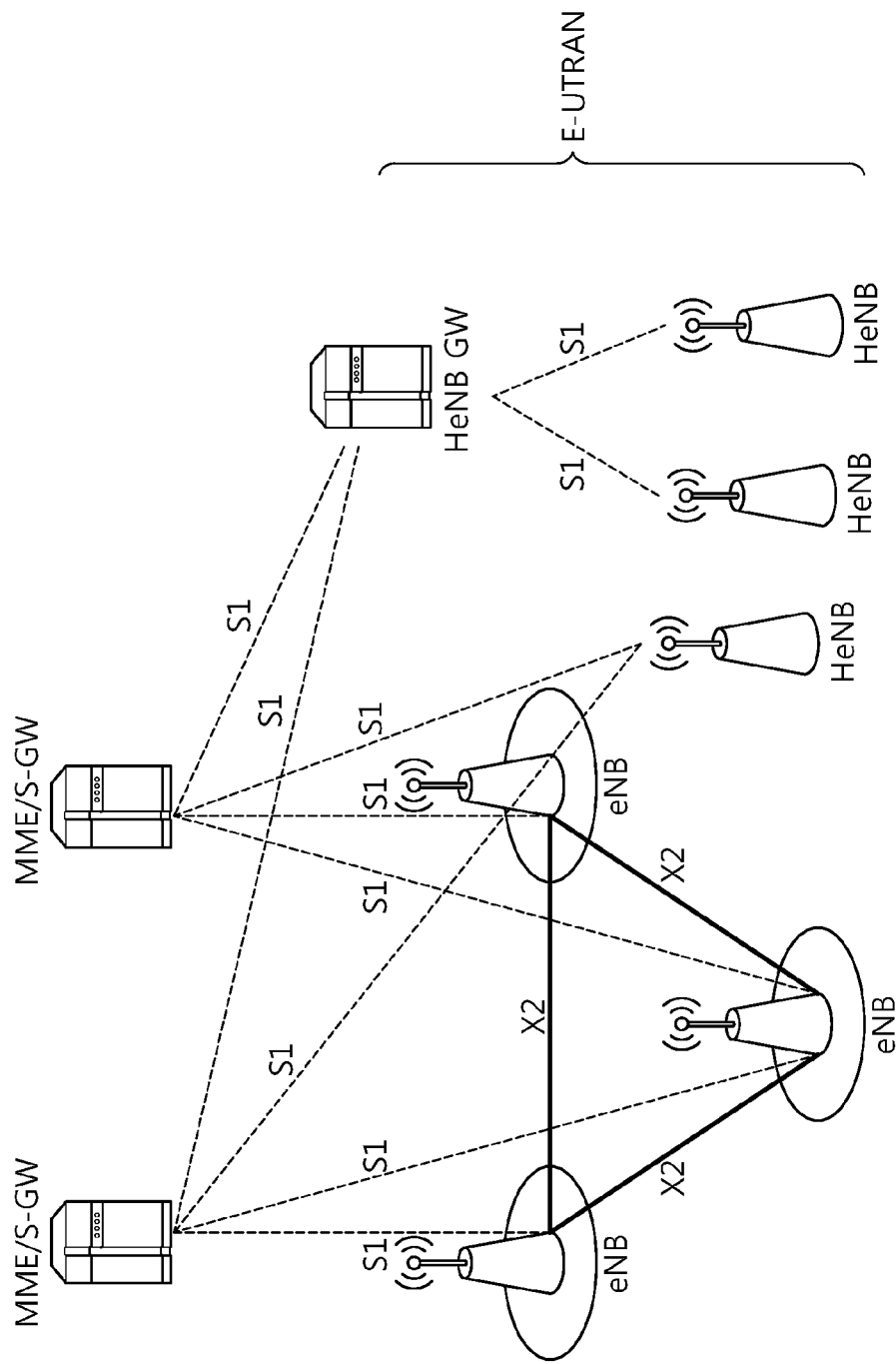
FIG. 14 shows an example of a wireless communication system for operating an HeNB.

FIG. 14 shows an example of a wireless communication system for operating an HeNB.

Referring to FIG. 14, a home eNB gateway (HeNB GW) can be operated to provide a service to the HeNB as described above. HeNBs are connected to an EPC directly or via the HeNB GW. An MME regards the HeNB GW as a typical eNB. Further, the HeNB regards the HeNB GW as the MME. Therefore, the HeNB and the HeNB GW are connected by means of an S1 interface, and also the HeNB GW and the EPC are connected by means of the S1 interface. Furthermore, even in a case where the HeNB and the EPC are directly connected, they are connected by means of the S1 interface. A function of the HeNB is almost similar to a function of the typical eNB.

In general, the HeNB has radio transmission output power lower than that of an eNB owned by a mobile network vendor. Therefore, in general, the coverage provided by the HeNB is smaller than the coverage provided by the eNB. Due to such characteristics, a cell provided by the HeNB is often classified as a femto cell in contrast to a macro cell provided by the eNB from the perspective of the coverage. Meanwhile, from the perspective of provided services, when the HeNB provides the services only to the CSG group, a cell provided by this HeNB is referred to as a CSG cell.

Each CSG has its own identity which is called a CSG identity (CSG ID). The UE may have a list of CSGs to which the UE belongs as a member thereof, and this CSG list may change by a request of the UE or by a command of the network. In general, one HeNB can support one CSG.

The HeNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell.

It is not always required for the HeNB to allow access of the CSG UE. Based on the configuration setting of the HeNB, access of a non-CSG member UE may also be allowed. According to the configuration setting of the HeNB, access is allowed for a different UE. Herein, the configuration setting denotes setting of an operation mode of the HeNB. The operation mode of the HeNB is classified into three modes described below, depending on a type of UE for which a service is provided.

1) Closed access mode: A mode in which services are provided to particular CSG members only. The HeNB provides a CSG cell.

2) Open access mode: A mode in which services are provided without any restriction of particular CSG members, similarly to the typical eNB. The HeNB provides a typical cell instead of a CSG cell.

3) Hybrid access mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HeNB notifies to the UE whether a cell serviced by the HeNB is a CSG cell or a typical cell, and thus allows the UE to know whether the UE can access to the cell. When operating in the closed access mode, the HeNB broadcasts that the cell serviced by the HeNB is the CSG cell by using system information. When operating in the open access mode, the HeNB broadcasts that the cell serviced by the HeNB is not the CSG cell by using the system information. In this manner, the HeNB inserts a CSG indicator into the system information, wherein the CSG indicator indicates whether the cell being serviced by the HeNB is the CSG cell or not. For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell provided by the eNB from the typical cell, the typical eNB may also transmit the CSG indicator so as to allow the UE to know that the cell type provided by the eNB is the typical cell. The typical eNB may allow the UE to know that the cell type provided by the eNB is the typical cell by not transmitting the CSG indicator. The CSG-related parameters transmitted by the corresponding cell for each cell type are represented in Table 2. Subsequently, a type of UE for which access is accepted is represented in Table 3.

TABLE 2

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

TABLE 3

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

In general, CSG cells and (normal) macro cells may be concurrently managed at a particular frequency. Such a frequency is hereinafter called a mixed carrier frequency. The network may reserve a physical layer cell identity for the CSG cell at the mixed carrier frequency. The physical layer cell identity is called a physical cell identity (PCI) in E-UTRAN and is called a physical scrambling code (PSC) in UTRAN. For clarity, the physical layer cell identity will be expressed by the PCI. In the mixed carrier frequency, the CSG cell notifies information on the PCI reserved for the CSG cell at a current frequency by using the system information. The UE that has received this information can determine whether or not this cell is a CSG cell from the PCI of the cell when a certain cell is found at the corresponding frequency.

In a case where a UE does not support the CSG-related function or has no CSG list to which the UE itself belongs, the UE does not need to regard a CSG cell as a selectable cell during a cell selection/reselection process. In this case, the UE checks for only the PCI of the cell, and may immediately excludes the corresponding cell in the cell selection/reselection process if the PCI is a reserved PCI for the CSG. In general, the PCI of a certain cell can be immediately known during a process of checking for the existence of the corresponding cell in a physical layer by the UE.

In case of a UE having a CSG list to which the UE itself belongs, when the UE wants to know a list of neighboring CSG cells at a mixed carrier frequency, it may be known that the corresponding cell is a CSG cell if only a cell having the PCI reserved for CSG is found, instead of individually checking for the CSG ID of the system information for every cell found in the whole PCI range.

Now, a cell reselection method related to a CSG cell will be described.

The CSG cell is a cell for providing better-quality CSG services to its member UE. Therefore, when the UE is camped on the CSG cell, an inter-frequency cell reselection may not be appropriate in terms of QoS even if the UE finds an inter-frequency having a higher priority than a frequency priority of a serving frequency.

When the UE is camped on the CSG cell, in order to prevent an inter-frequency cell having a higher priority than the serving frequency from being selected in a cell reselection, if a CSG cell of a certain frequency is determined as a best-ranked cell according to a cell reselection evaluation criterion at that frequency, the UE assumes that a frequency priority of the corresponding frequency is higher than other frequencies. As such, when a frequency priority higher than a frequency priority that can be assigned by the network is assigned by the UE to a particular frequency, such a frequency priority is called an 'implicit highest priority'. In doing so, it is possible to help the UE to camp on the CSG cell without violation of the existing cell selection rule in which the frequency priority is first considered when the UE performs the cell reselection. If the UE camped on the CSG cell reselects a non-CSG cell of the corresponding frequency, the UE withdraws the assumption on the implicit highest priority of the CSG cell, and uses a frequency priority value delivered by the network in a cell reselection evaluation process. If the UE finds another best-ranked CSG cell at a frequency having the same frequency priority when the UE is camped on the CSG cell, whether the UE will reselect the CSG cell or will stay in the CSG cell on which the UE is currently being camped on is determined based on an implementation of the UE.

Subsequently, a handover method related to a CSG cell will be described.

While the UE is in RRC_CONNECTED state, the UE performs normal measurement and mobility procedures based on configuration provided by the network. The UE is not required to support manual selection of CSG IDs while in RRC_CONNECTED state. Handover to a HNB/HeNB follows the framework of UE assisted network controlled handover. Handover to a HNB/HeNB is different from the normal handover procedure in three aspects.

1. Proximity Estimation: in case the UE is able to determine, using autonomous search procedures, that it is near a CSG or hybrid cell whose CSG ID is in the UE's CSG whitelist, the UE may provide to the source eNB an indication of proximity. The proximity indication may be used as follows:

If a measurement configuration is not present for the concerned frequency/RAT, the source eNB may configure the UE to perform measurements and reporting for the concerned frequency/RAT.

The source eNB may determine whether to perform other actions related to handover to HNB/HeNBs based on having received a proximity indication (for example, the source eNB may not configure the UE to acquire system information of the HNB/HeNB unless it has received a proximity indication).

2. PSC/PCI Confusion: due to the typical cell size of HNB/HeNBs being much smaller than macro cells, there can be multiple HNBs/HeNBs within the coverage of the source eNB that have the same PSC/PCI. This leads to a condition referred to as PSC/PCI confusion, wherein the source eNB is unable to determine the correct target cell for handover from the PSC/PCI included in the measurement reports from the UE. PSC/PCI confusion is solved by the UE reporting the global cell identity of the target HNB/HeNB.

3. Access Control: if the target cell is a hybrid cell, prioritization of allocated resources may be performed based on the UE's membership status. Access control is done by a two step process, where first the UE reports the membership status based on the CSG ID received from the target cell and the UE's CSG whitelist, and then the network verifies the reported status.

Mobility from eNB/HeNB to a HeNB's CSG/hybrid cell takes place with the S1 Handover procedure. In the following call flow the source cell can be an eNB or a HeNB. The procedure applies to any scenario where the CSG ID is provided by the UE or provided by the source eNB.

Figure 15:
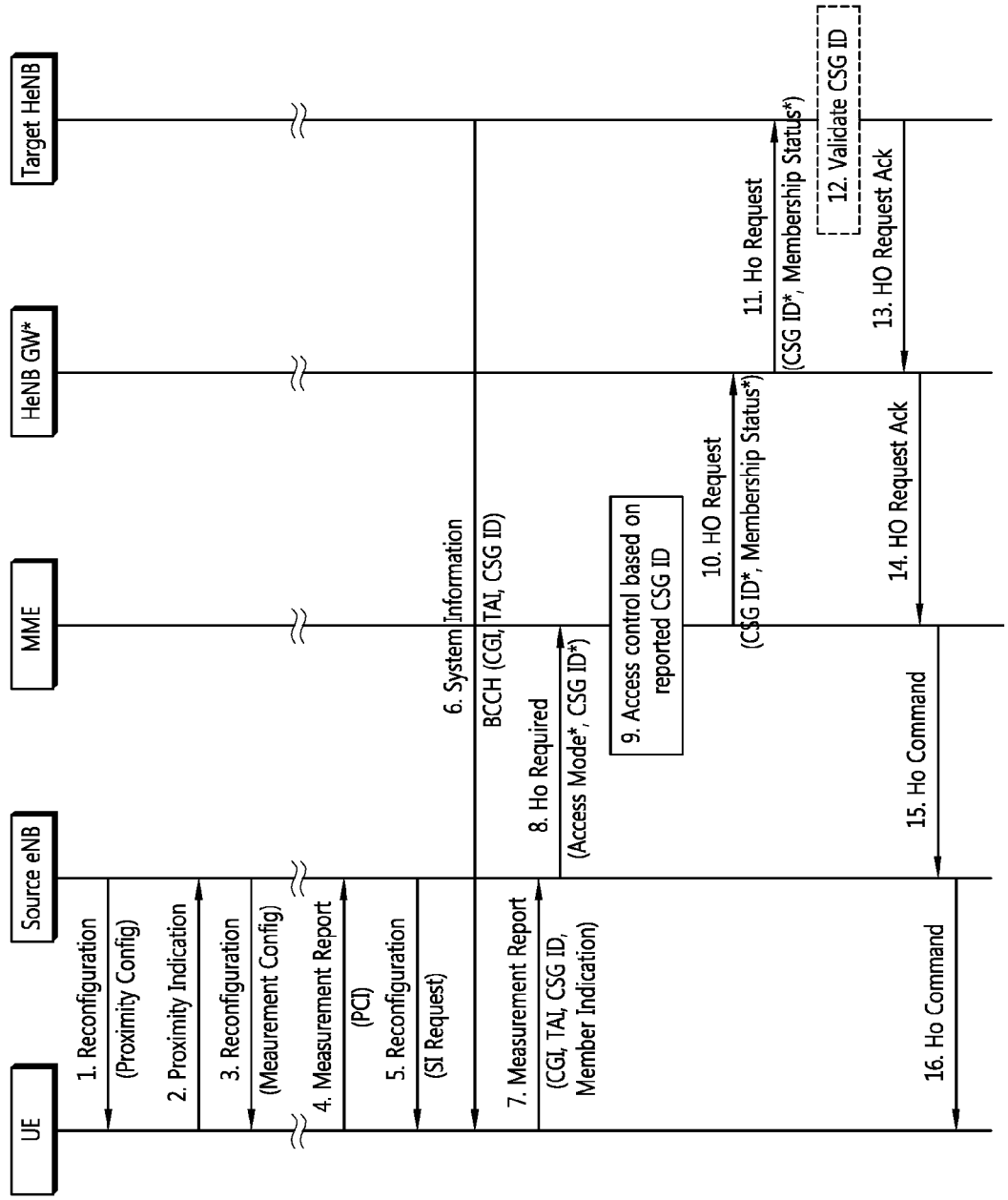
FIG. 15 is a flowchart showing a handover procedure for CSG cell.

FIG. 15 is a flowchart showing a handover procedure for CSG cell.

Referring to the FIG. 15, the handover procedure for the CSG cell follows:

Step. 1 The source eNB configures the UE with proximity indication control. For this, the source eNB may transmit a reconfiguration message to the UE. The configuration message includes information for a configuration of the proximity indication.

Step. 2 The UE sends an "entering" proximity indication when it determines it may be near a cell (based on autonomous search procedures) whose CSG ID is in the UE's CSG whitelist. The proximity indication includes the RAT and frequency of the cell.

Step. 3 If a measurement configuration is not present for the concerned frequency/RAT the source eNB configures the UE with relevant measurement configuration including measurement gaps as needed, so that the UE can perform measurements on the reported RAT and frequency. For this, the source eNB transmit a reconfiguration message to the UE. The reconfiguration message may include information for a configuration of the measurement.

The network may also use the proximity indication to minimize the requesting of handover preparation information of CSG/hybrid cells by avoiding requesting such information when the UE is not in the geographical area where cells whose CSG IDs are in the UEs CSG White-list are located.

Step. 4 The UE sends a measurement report including the PCI (e.g., due to triggered event A3).

Step. 5 The source eNB configures the UE to perform system information acquisition and reporting of a particular PCI.

Step. 6 The UE performs the system information acquisition using autonomous gaps, i.e., the UE may suspend reception and transmission with the source eNB within the limits defined in [TS 36.133] to acquire the relevant system information from the target HeNB.

Step. 7 The UE sends a measurement report including (E-)CGI, TAI, CSG ID and "member/non-member" indication.

Step. 8 The source eNB includes the target E-CGI and the CSG ID in the Handover Required message sent to the MME. If the target is a hybrid cell the Cell Access Mode of the target is included.

Step. 9 The MME performs UE access control to the CSG cell based on the CSG ID received in the Handover Required message and the stored CSG subscription data for the UE. If the access control procedure fails, the MME ends the handover procedure by replying with the Handover Preparation Failure message. If the Cell Access Mode is present, the MME determines the CSG Membership Status of the UE handing over to the hybrid cell and includes it in the Handover Request message.

Steps. 10-11 The MME sends the Handover Request message to the target HeNB including the target CSG ID received in the Handover Required message. If the target is a hybrid cell, the CSG Membership Status will be included in the Handover Request message.

Step. 12 The target HeNB verifies that the CSG ID received in the Handover Request message matches the CSG ID broadcast in the target cell and if such validation is successful it allocates appropriate resources. UE prioritisation may also be applied if the CSG Membership Status indicates that the UE is a member.

Steps. 13-14 The target HeNB sends the Handover Request Acknowledge (ACK) message to the MME via the HeNB GW if present.

Step. 15 The MME sends the Handover Command message to the source eNB.

Step. 16 The source eNB transmits the Handover Command (RRC Connection Reconfiguration message including mobility control information) to the UE.

The above Steps 1-9, 15 and 16 may also be applied to inter-RAT mobility from LTE to HNB.

After sending an "entering" proximity indication (step 2), if the UE determines that it is no longer near a cell whose CSG ID is in the UE's CSG whitelist, the UE sends a "leaving" proximity indication to the source eNB. Upon reception of this indication, the source eNB may reconfigure the UE to stop measurements on the reported RAT and frequency.

In the above procedure, steps 2 and 3 may not be performed in case the UE has not previously visited the HeNB, e.g., when the UE first visits a hybrid cell.

The PCI confusion is resolved by steps 5, 6 and 7. The source eNB can request the system information acquisition and reporting for any PCI, not limited to PSCs/PCIs of CSG or hybrid cells.

A network can support offloading which reduces an overload by moving a UE to cells of another frequency when traffic of cells of a specific frequency is overloaded. A cell having a smaller cell coverage than a macro cell, for example, a pico cell, a femto cell, or the like can be used to effectively offload overload traffic of a specific cell coverage. In addition, a cell having a small coverage such as the pico cell and the femto cell has an advantage in terms of a network configuration and an operating cost, and thus has recently drawn attention of vendors in terms of a network operation management policy.

When the UE which receives a service from the macro cell moves into a coverage of a small cell, the UE can receive a service from the cell. Meanwhile, small cells such as the pico cell and the femto cell may be a cell having a frequency property different from a frequency of a serving cell from which the UE is currently receiving the service, that is, may be an inter-frequency cell.

In order to normally perform offloading to the inter-frequency cell, when detecting existence of the cell in a small cell coverage, the UE must be able to report the detection result to a serving cell of the UE. For this, the macro cell configures an inter-frequency cell measurement configuration to the UE. The UE can regularly perform measurement on the inter-frequency cell according to the measurement configuration received from the macro cell.

Figure 16:
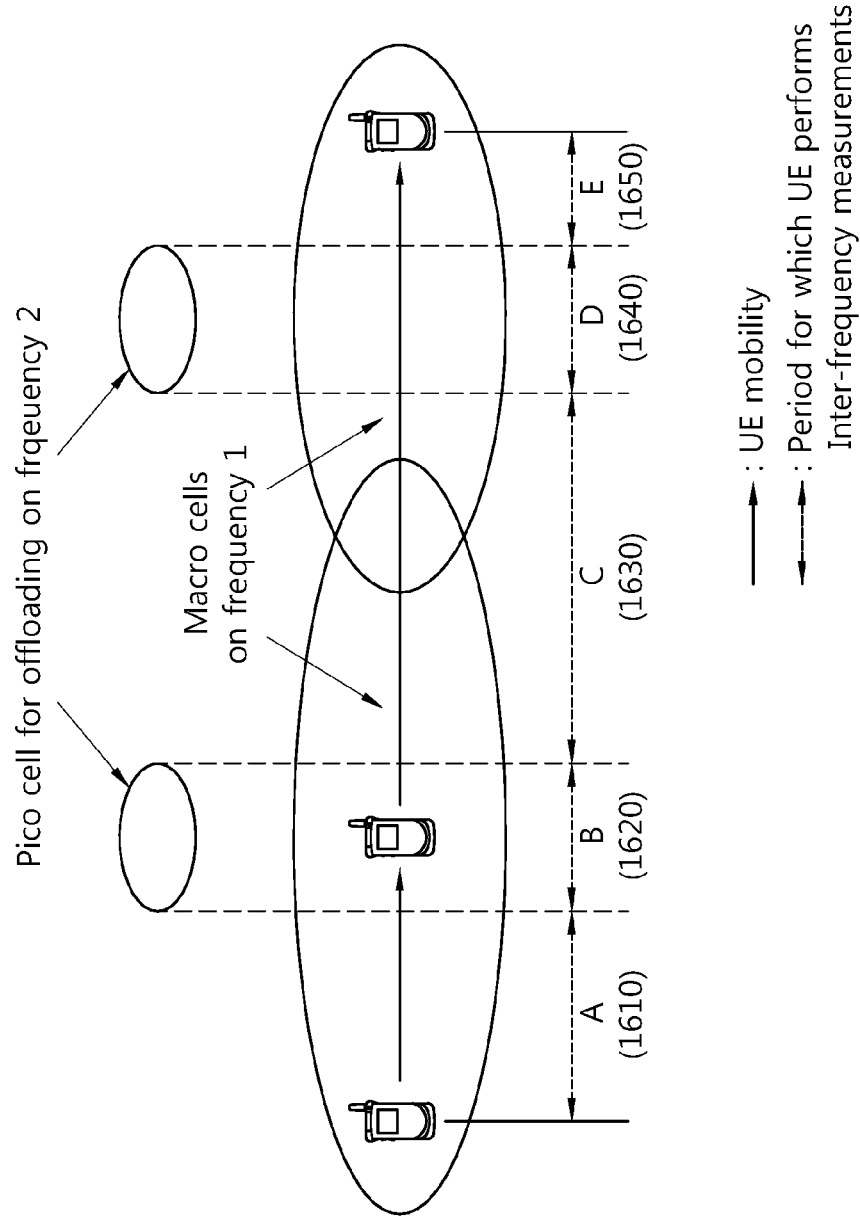
FIG. 16 shows an example of a wireless communication system structure to which an embodiment of the present invention is applicable.

FIG. 16 shows an example of a wireless communication system structure to which an embodiment of the present invention is applicable.

Referring to FIG. 16, at present, a serving frequency of a UE is frequency 1, and the UE receives a service from a macro cell which is operating on the frequency 1. The macro cell of the frequency 1, that is, a serving cell can configure an inter-frequency measurement configuration for a frequency 2 to the UE for the purpose of offloading. When it is known through measurement that the UE is located in a coverage of a pico cell of the frequency 2, the measurement configuration is for reporting this to the serving cell. The UE performs measurement of the frequency 2, that is, inter-frequency measurement, on the basis of the inter-frequency measurement configuration.

In FIG. 16, a period in which the UE performs the inter-frequency measurement is classified into a period A 1610, a period B 1620, a period C 1630, a period D 1640, and a period E 1650. Among the period A 1610, the period B 1620, the period C 1630, the period D 1640, and the period E 1650, a pico cell which is operating on frequency 2 is detected through the inter-frequency measurement of the UE in the periods B and D. In the remaining periods A, C, and E, even if the pico cell does not exist, the UE persistently performs the inter-frequency measurement according to the configured measurement configuration.

When performing the inter-frequency measurement, the UE performs measurement based on a signal for another frequency other than a frequency of the serving cell, and thus cannot receive a service from the serving cell. When located in an inter-frequency cell coverage, the inter-frequency measurement performed by the UE has a disadvantage in that a service persistently provided from the serving cell is suspended, but an effect as a procedure for traffic offloading can be expected. Meanwhile, performing of the inter-frequency measurement even though the UE is not located in the inter-frequency cell coverage in practice cannot expect any effect in terms of traffic offloading, and may cause a problem in which service quality of the UE deteriorates.

In order to solve the aforementioned problem, it is possible to propose a method in which the UE reports that a cell having a specific property such as an inter-frequency is detected from the network, obtains a measurement configuration value corresponding thereto, and thereafter measurement is performed on a corresponding cell. Hereinafter, a method of performing mobility of the UE on the basis of cell detection/reporting by the UE will be described in detail.

The network transmits a report configuration to the UE so as to instruct the UE to detect the cell having the specific property and to report the detection result. The cell having the specific property may be an inter-frequency cell or may be a cell having a specific cell type such as a pico cell and a femto cell. Such cells are hereinafter called a cell of a specific type.

The report configuration may include an indicator for indicating detection of the cell of the specific type to the network when the UE detects the cell of the specific type.

The report configuration may include information regarding a target cell of which existence is detected and reported by the UE. The information regarding the target cell may be an indicator(s) for directly indicating the cell of the specific type. The information regarding the target cell may be information which allows the UE to determine whether the cell corresponds to the cell of the specific type. The information regarding the cell and included in the report configuration can be configured independently for each frequency that can be a measurement target.

A specific type of a cell which is a detection and/or report target of the UE can be proposed in various methods. The cell of the specific type may be a cell included in a cell list provided by the network to the UE. The cell list can be implemented with a list of an identifier of a target cell(s). In this case, the identifier of the cell may be a physical layer cell identifier (PCI). This information may differ for each frequency. The network can provide the cell list to the UE for each frequency. A cell included in the list may be a pico cell and/or a femto cell, and may also be a CSG cell.

The cell of the specific type may be a cell having a smaller coverage that the macro cell. For example, the cell type may be a pico cell or a femto cell. The cell of the specific type may be a CSG cell.

The cell of the specific type may correspond to a cell which exists in a specific location. The network can provide in advance information regarding a location in which cells corresponding to the specific type exist.

The UE can detect the existence of the cell of the specific type and can report this to the network. When the UE receives a signal capable of identifying the existence of the cell of the specific type, the UE can determine that the aforementioned cell of the specific type is detected. For example, it can be determined that the cell of the specific type is determined on the basis of a PCI of a cell. When the UE knows in advance a list of a cell(s) of the specific type, the UE can determine whether the cell is included in the list by comparing the PCI and the cell list.

The cell of the specific type is a cell having a smaller coverage than the macro cell, and may be a pico cell or a femto cell. In this case, the UE can perform cell detection by receiving the PCI and by determining whether the cell corresponds to the pico cell and/or the femto cell. If the cell of the specific type is the CSG cell, the UE can determine whether the cell is the CSG cell on the basis of a CSG list pre-known to the UE or a CSG list provided from the network.

When the UE has information regarding a location in which the cell(s) of the specific type exist, the UE can determine that the cell of the specific type is detected upon entering the location. The UE can obtain location information of the UE by using a global navigation satellite system (GNSS), a global positioning system (GSP), etc.

Upon detecting the cell of the specific type, the UE reports this to the network. The reporting of detecting the cell of the specific type can be implemented by transmitting additional information inserted to an existing RRC message. The additional information may be transmitted by being inserted to a proximity indication or may be transmitted by being inserted to a measurement report, which are RRC messages.

The additional information may include an indicator indicating that the RRC message transmitted by the UE is transmitted to report the detection of the cell of the specific type or may include information corresponding thereto. The network can receive the RRC message such as the proximity indication and/or the measurement report, and can know that the message is transmitted to report the detection of the cell of the specific type and determine the type of the detected cell by using additional information included in the RRC message.

The additional information can include information related to the type of the cell detected by the UE. The cell type related information can indicate a PCI of the detected cell. The cell type related information can indicate a coverage size of the cell detected by the UE. The cell type related information can indicate that the detected cell is a pico cell. The cell type related information can indicate that the detected cell is a femto cell.

The additional information may be information regarding the cell detected by the UE. The information regarding the cell may include a measurement value indicating quality of the detected cell. The measurement value may be reference signal received power (RSRP) and/or reference signal received quality (RSRQ). When the UE detects a plurality of cells corresponding to the specific type, the additional information can be generated and transmitted for the plurality of cells.

If the cell detected by the UE is a CSG cell, the UE can transmit the additional information by further inserting CSG related information to the additional information. The CSG related information may be CSG membership information and/or CSG ID information. The CSG membership information may be information indicating whether the UE is a CSG member capable of receiving a service from the CSG cell.

The CSG membership information may be membership information determined from information of a cell stored when the UE has previously visited the CSG cell. The CSG membership information may be membership information determined from system information received from the CSG cell after the UE detects the CSG cell. If the CSG membership information is not determined from the system information directly obtained after the UE detects the CSG cell but is determined on the basis of the stored information, indication information thereon can be transmitted to the network by further inserting the information to the CSG membership information.

The CSG ID information can indicate a CSG ID included in information of a CSG cell stored when the UE has previously visited the CSG cell. The CSG ID information can indicate a CSG ID included in system information received directly from the CSG cell after the UE detects the CSG cell. If the CSG ID is not a CSG ID received directly from the system information received after the UE detects the cell but is obtained from the previously stored information, indication information thereon can be transmitted to the network by further inserting the information to the CSI ID information.

Upon receiving a cell detection report message including the additional information, the serving cell transmits a measurement configuration for specific-type cell measurement to the UE.

Upon receiving the measurement configuration from the serving cell, the UE can perform measurement on the specific-type cell detected on the basis of the received measurement configuration, and can report the measurement result to the serving cell.

The network including the serving cell can determine whether to perform a handover on the basis of the measurement result, and if the handover is necessary, can transmit a handover command message instructing the handover to the UE. The UE can perform the handover to the detected cell of the specific type according to the handover command message.

A cell detection/reporting method performed by the UE has been described above in detail. Hereinafter, a method of performing mobility of the UE on the basis of the aforementioned cell detection/reporting will be described with reference to the accompanying drawings.

Figure 17:
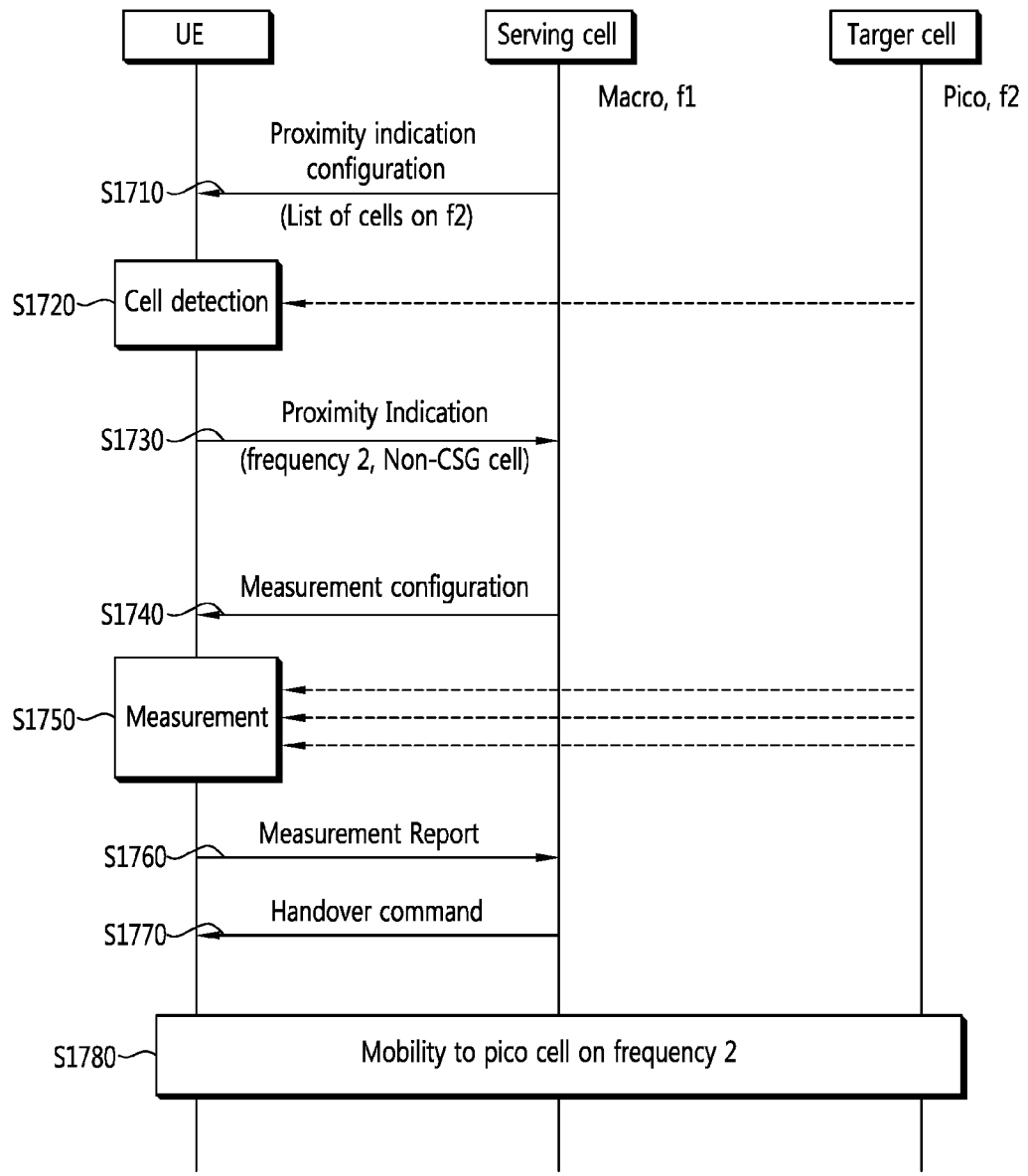
FIG. 17 shows an example of a method of performing mobility according to an embodiment of the present invention.

FIG. 17 shows an example of a method of performing mobility according to an embodiment of the present invention.

Referring to FIG. 17, a UE receives a proximity indication configuration from a serving cell (step S1710). The proximity indication configuration is information regarding a cell of a specific type, and may include a list of cells operating on a frequency f2.

The UE detects whether there is a cell included in the frequency cell list (step S1720). This measurement can be performed using a best effort scheme, that is, in a manner that the UE performs measurement when there is an opportunity for measurement on the frequency f2.

The UE detects a cell included in the cell list on the frequency f2, and reports contents thereon to the serving cell by using a proximity indication (step S1730). To report that the detected cell is not a CSG cell, the UE can transmit the proximity indication by inserting a non-CSG cell indicator, i.e., an indicator indicating a non-CSG cell, to the proximity indication. The non-CSG cell indicator may be used to indicate that the proximity indicator which is one of RRC messages is transmitted to report detection of the cell which is not the CSG cell.

When announcing the detection of the cell, the UE may transmit a PCI of the detected cell in the proximity indication. In this case, it is assumed that a network can determine a type of the cell by using the PCI transmitted by the UE.

The serving cell transmits a measurement configuration to the UE so that the UE can perform measurement on the cell (step S1740). The measurement configuration may include information which allows the UE to perform inter-frequency measurement for the frequency f2. The serving cell can configure and transmit measurement configuration information suitable for the UE by referring to whether the non-CSG cell indicator is included in the proximity indication.

The UE performs measurement on a target cell on the basis of the measurement configuration information (step S1750). Since measurement configuration information necessary for inter-frequency measurement for the frequency f2 is received from the serving cell, the UE can perform inter-frequency measurement for f2.

When the target cell of the frequency f2 satisfies a report condition of a measurement configuration, the UE reports a measurement result for the target cell to the serving cell (step S1760). The measurement result can be transmitted by being included in a measurement report message.

Upon receiving the measurement result from the UE, the serving cell determines whether the UE performs a handover to the target cell and thereafter transmits a handover command message to the UE (step S1770).

The UE performs mobility to the target cell which is operating on the frequency f2 (step S1780). In this case, the UE performs the handover to the target cell.

Figure 18:
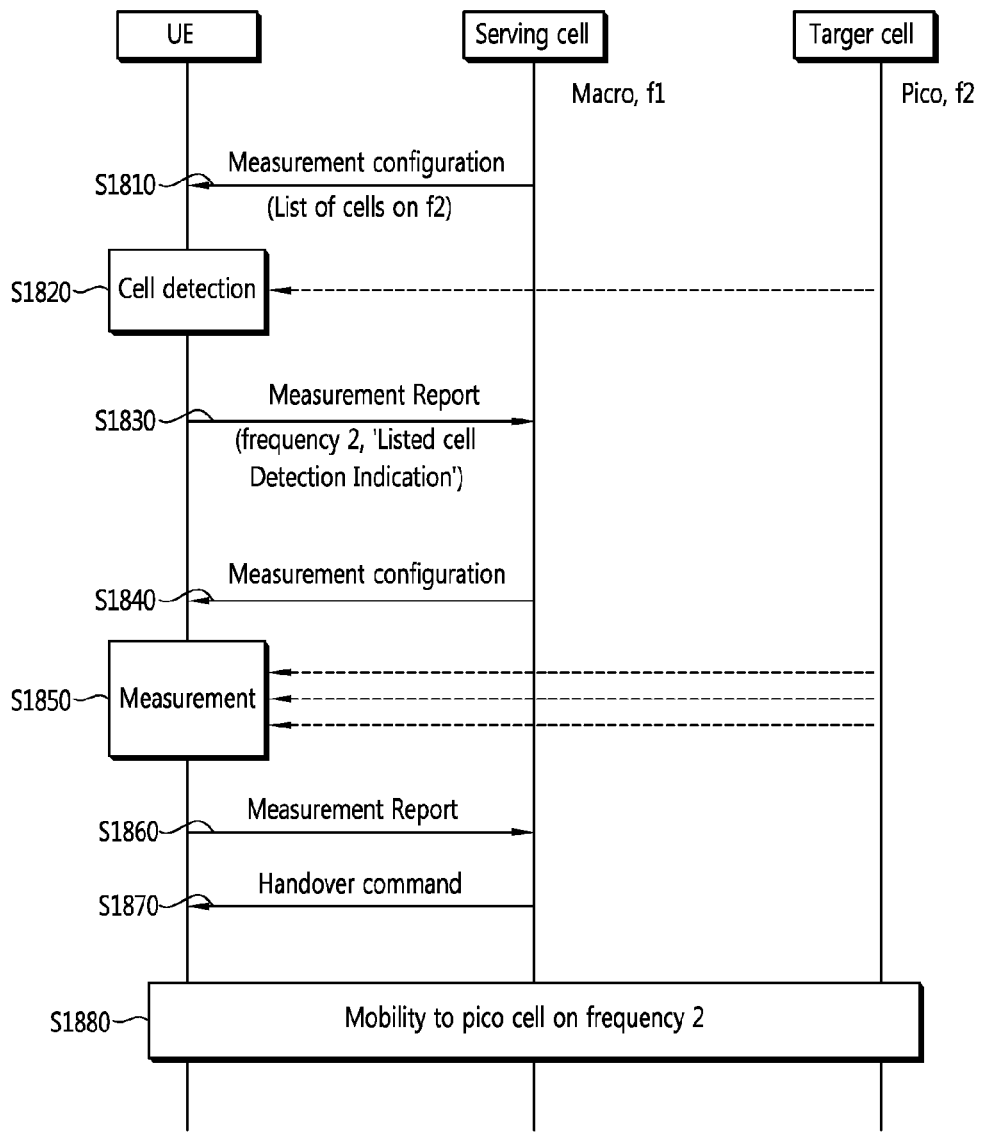
FIG. 18 shows another example of a method of performing mobility according to an embodiment of the present invention.

FIG. 18 shows another example of a method of performing mobility according to an embodiment of the present invention.

Referring to FIG. 18, a UE receives a measurement configuration from a serving cell (step S1810). The measurement configuration is information regarding a cell of a specific type, and may include a list of cells operating on a frequency f2.

The UE detects whether there is a cell included in the frequency cell list (step S1820). This measurement can be performed using a best effort scheme, that is, in a manner that the UE performs measurement when there is an opportunity for measurement on the frequency f2.

The UE detects a cell included in the cell list on the frequency f2, and reports contents thereon to the serving cell by using transmission of a measurement report (step S1830). The UE can transmit a listed cell detection indicator indicating detection of the cell included in the cell list by inserting the indicator into the measurement report. Therefore, even if the measurement report is received, the serving cell can confirm existence of the listed cell detection indicator and can determine whether a measurement configuration of a specific cell type needs to be transmitted to the UE.

The serving cell transmits a measurement configuration to the UE so that the UE can perform measurement on the cell (step S1840). The measurement configuration may include information which allows the UE to perform inter-frequency measurement for the frequency f2. The serving cell can configure and transmit measurement configuration information suitable for the UE by referring to whether the listed cell detection indicator is included.

The UE performs measurement on a target cell on the basis of the measurement configuration information (step S1850). Since measurement configuration information necessary for inter-frequency measurement for the frequency f2 is received from the serving cell, the UE can perform inter-frequency measurement for f2.

When the target cell of the frequency f2 satisfies a report condition of a measurement configuration, the UE reports a measurement result for the target cell to the serving cell (step S1860). The measurement result can be transmitted by being included in a measurement report message.

Upon receiving the measurement result from the UE, the serving cell determines whether the UE performs a handover to the target cell and thereafter transmits a handover command message to the UE (step S1870).

The UE performs mobility to the target cell which is operating on the frequency f2 (step S1880). In this case, the UE performs the handover to the target cell.

Figure 19:
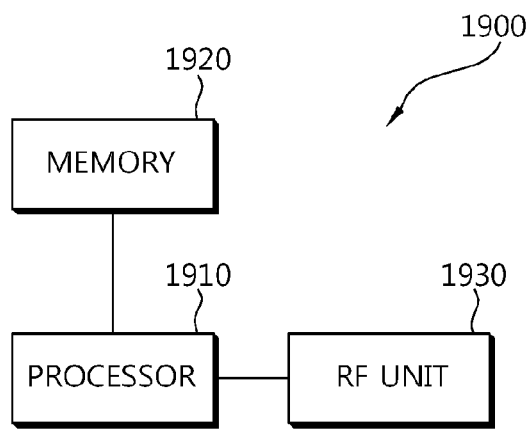
FIG. 19 is a block diagram showing a wireless apparatus according to an embodiment of the present invention.

FIG. 19 is a block diagram showing a wireless apparatus according to an embodiment of the present invention. The apparatus implements an operation of a UE according to the embodiments of FIG. 16 to FIG. 18.

A wireless apparatus 1900 includes a processor 1910, a memory 1920, and a radio frequency (RF) unit 1930. The processor 1910 implements the proposed functions, procedures, and/or methods. The processor 1910 receives information regarding a cell of a specific type to be detected from a network, and detects whether the cell exists. Upon detecting the cell of the specific type, the processor 1910 reports this to the network. If an additional measurement configuration is received from the network, the processor 1910 measures a target cell of the specific type on the basis of the received additional measurement configuration. If a measurement result for the target cell satisfies a condition for a measurement report, the processor 1910 transmits the measurement report to the network, and performs mobility according to a command of the network.

The embodiments of FIG. 16 to FIG. 18 can be determined by the processor 1910 and the memory 1920.

The RF unit 1930 coupled to the processor 1910 transmits and receives a radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method for performing mobility by a user equipment (UE) in a wireless communication system, the method comprising:
   receiving, by the UE from a serving cell operating on a first frequency, a proximity indication configuration message that includes a list of cells operating on a second frequency;
   detecting, by the UE, whether a specific cell is present in the list of cells operating on the second frequency,
   wherein the specific cell is a pico cell having a specified coverage;
   transmitting, by the UE to the serving cell, a proximity indication message that includes an indication indicating that the UE detects the specific cell in the list of cells operating on the second frequency,
   wherein the indication included in the proximity indication message further indicates that the specific cell is not a closed subscriber group (CSG) cell;
   receiving, by the UE from the serving cell, a measurement configuration used for measuring the specific cell;
   measuring, by the UE, the specific cell on the second frequency based on the measurement configuration;
   transmitting, by the UE to the serving cell, a measurement result when the specific cell operating on the second frequency satisfies a report condition of the measurement result;
   receiving, by the UE from the serving cell, a handover command message when the serving cell decides to perform the handover of the UE; and
   performing, by the UE, a handover to the specific cell based on the measurement of the specific cell.

2. The method of claim 1, wherein the proximity indication message further includes information about the specific cell.

3. The method of claim 2, wherein the information about the specific cell includes a measured signal quality of the specific cell.

4. The method of claim 2, wherein the information about the specific cell includes a physical cell identifier of the specific cell.

5. A wireless apparatus comprising:
a radio frequency (RF) unit transmitting and receiving a radio signal;
a processor operably coupled to the RF unit and configured to:
receive, from a serving cell operating on a first frequency, a proximity indication configuration message that includes a list of cells operating on a second frequency;
detect whether a specific cell is present in the list of cells operating on the second frequency,
wherein the specific cell is a pico cell having a specified coverage;
transmit, to the serving cell, a proximity indication message that includes an indication indicating that the UE detects the specific cell in the list of cells operating on the second frequency,
wherein the indication included in the proximity indication message further indicates that the specific cell is not a closed subscriber group (CSG) cell;
receive, from the serving cell, a measurement configuration used for measuring the specific cell;
measure the specific cell on the second frequency based on the measurement configuration;
transmit, to the serving cell, a measurement result when the specific cell operating on the second frequency satisfies a report condition of the measurement result;
receive, from the serving cell, a handover command message when the serving cell decides to perform the handover of the UE; and
perform a handover to the specific cell based on the measurement of the specific cell.

6. The wireless apparatus of claim 5, wherein the proximity indication message further includes information about the specific cell.

7. The wireless apparatus of claim 5, wherein the information about the specific cell includes a measured signal quality of the specific cell.

* * * * *